United States Patent [19]

Ashton et al.

[11] Patent Number: 4,975,914

[45] Date of Patent: Dec. 4, 1990

[54] NON-DISRUPTIVE SESSION RECOVERY

[75] Inventors: James L. Ashton, Cary; Robert T. Gibbs; Michael F. Gierlach, both of Raleigh; James P. Gray, Chapel Hill; Jeffrey G. Knauth, Raleigh, all of N.C.; Guy Platel, La Gaude, France; Stuart W. Pretzman; Lawrence E. Troan, both of Raleigh, N.C.

[73] Assignee: International Business Machines Corporation, Armonk, N.Y.

[21] Appl. No.: 301,193

[22] Filed: Jan. 24, 1989

[51] Int. Cl.$^5$ .............................................. G06F 11/20
[52] U.S. Cl. ................................................. 371/11.2
[58] Field of Search ...................... 371/11.2, 11.3, 8.2; 364/200 MS File, 900 MS File; 340/825.03, 827

[56] References Cited

U.S. PATENT DOCUMENTS 4,119,815 10/1978 Frankfort et al. .................. 379/216
4,763,329 8/1988 Green ................................. 371/11.2

Primary Examiner—Charles E. Atkinson
Attorney, Agent, or Firm—John B. Frisone

[57] ABSTRACT

A method of operating a communication system which includes a number of host systems each communicating via sessions with other devices over different connections and in which the sessions assigned to a failed connection are suspended for a first and second time period and non-destructively moved to an alternate connection when a unique command is issued by one of the host systems and received by a control unit involved in the failed connection.

2 Claims, 4 Drawing Sheets

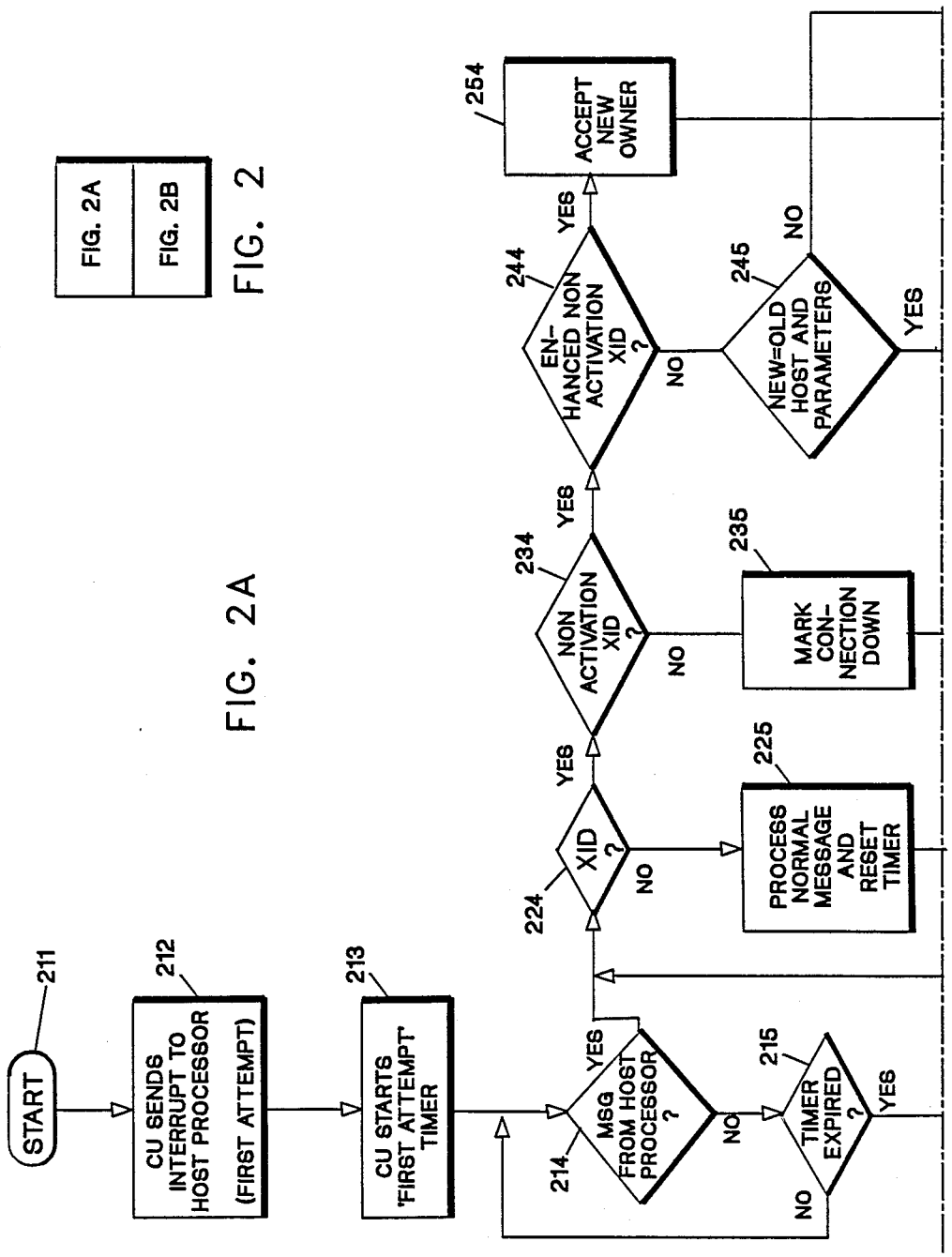

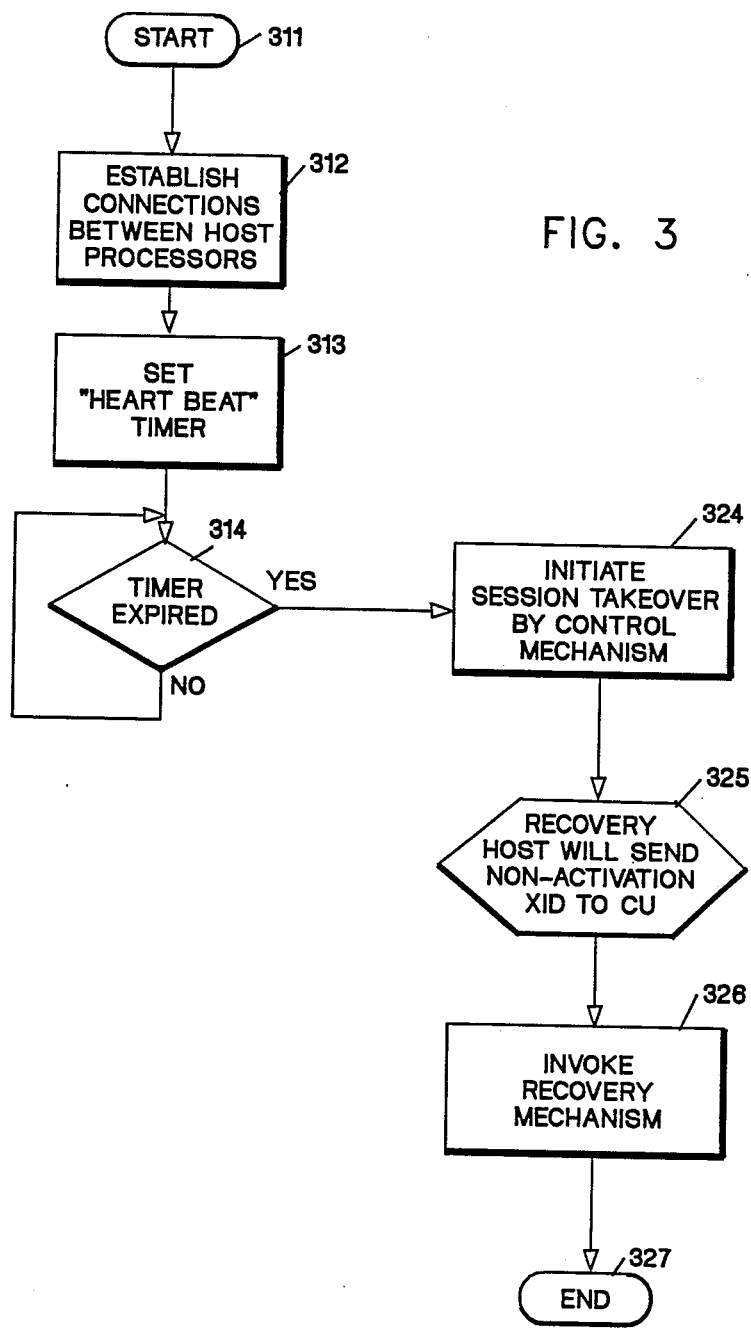

NON-DISRUPTIVE SESSION RECOVERY

FIELD OF THE INVENTION

This invention relates to data communications and more particularly to a method of providing non-disruptive recovery when all or part of a host processor fails while applications are in session with one or more remote nodes and the function being performed by the failing host processor is recovered on another host processor. For this invention, the logical connection between an application in a host processor and a remote node is called a session.

BACKGROUND OF THE INVENTION

In currently available systems, sessions between an application running on a host processor and one or more remote nodes (which could also be applications on another host processor) are currently disrupted when any element in the connection such as an application, a host processor on which the application is running or communication paths there between fail. As a result of the failure, the sessions are broken and must be re-established. The remote node is generally aware of the failure and is often involved in the recovery process.

SUMMARY OF THE INVENTION

The invention contemplates a control method for use in a computer communication system which includes a plurality of host systems or computers connected by a switching network to a plurality of communication control units each of which may be connected to one or more remote devices. The host systems engage in one or more sessions with the remote devices over physical connections through the switching network, the communication control units and the interconnecting conductors or paths which are subject to failure. The host systems periodically provide status information (valid/fail) concerning the connections to each other and each selectively attempt to reestablish alternate connections upon detection of a failed connection by establishing an alternate path through the switching network to the communication control unit associated with the failed connection and issuing a unique command to the communication control unit which indicates the new connection. The control units, at the same time, set a first time period on when service over the connection is required and reset the first time period when service is granted. In those instances where the first time period expires before service is granted, the unit may make additional attempts (0−n) by setting and resetting the first timer and after the preselected numbers have been made unsuccessfully setting a second timer. After expiration of the second timer deactivate the sessions assigned to the connection. If the control unit receives a unique command prior to the expiration of the second timer, the sessions associated with the failed connections are moved to the alternate connection over which the unique command was received, and communication over the sessions is resumed.

BRIEF DESCRIPTION OF THE DRAWINGS

FIGS. 2, 2A and 2B is a flow chart where a control unit detects a failure of a host processor and waits for another host processor to begin recovery.

FIG. 3 is a flow chart that shows the detection of a connection failure to a host processor and the switching of the sessions whose applications reside in that failing host processor to a recovering host processor. The recovering host processor may elect to renegotiate some of the parameters used for the prior connection between failing host processor and the control units.

DETAILED DESCRIPTION

Figure 1:
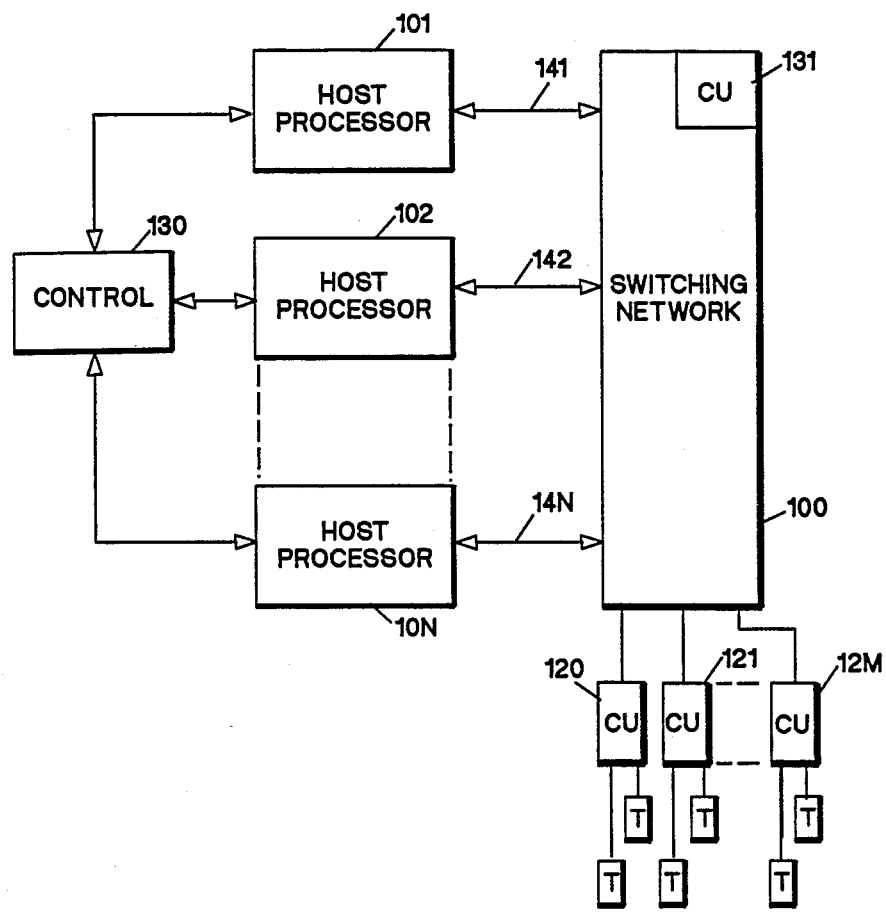
FIG. 1 is a block diagram of a plurality of host processors in a complex interconnected by a control mechanism. These host processors are mesh connected through a switching network to one or more control units and ultimately to one or more terminals or other remote nodes.

FIG. 1 is a block diagram of a typical data communications network which may employ the invention disclosed herein. The network may be constructed and configured in accordance with the IBM Systems Network Architecture (SNA), and more particularly IBM Low Entry Networking. In the interest of economy, the descriptions which follow will refer to certain structures (both physical and logical), functions and commands related to that architecture. For a more complete description of the network architecture, reference may be had to the IBM publications listed below:

Systems Network Architecture Concepts and Products (GC30-3072), copyright 1986, International Business Machines Corporation;

Systems Network Architecture—Technical Overview (GC30-3073), copyright 1986, International Business Machines Corporation;

Systems Network Architecture Format and Protocol Reference: Architectural Logic for T2.1 Nodes (SC30-3422), copyright 1988, International Business Machines Corporation;

Systems Network Architecture: Formats (GA27-3136), copyright 1987, International Business Machines Corporation;

IBM System/360 and System/370 I/O Interface Channel to Control Unit Original Equipment Manufacturers' Information (GA22-6974), copyright 1984, International Business Machines Corporation;

Network Control Program, Emulation Program: Reference Summary and Data Areas (LY30-5603), copyright 1988, International Business Machines Corporation;

A. E. Baratz, J. P. Gray, P. E. Green, Jr., J. M. Jaffe and D. P. Pozefsky, "SNA Networks of Small Systems," IEEE Journal on Selected Areas in Communications, Vol. SAC-3, No. May 3, 1985.

In FIG. 1 a plurality of host processors 101, 102, . . . , 10n are interconnected by a conventional switching network 100 which includes a programmed control unit 131. Each host processor is physically attached to the network 100 by a connection 141, 142, . . . , 14n. Each such connection has a unique identity, and each host processor must periodically indicate the status (valid/invalid) to a control unit 130 for each connection that the host processor maintains. The function of control unit 130 will be described later. The particular type of connection used between the host processors 101–10n and the switching network 100 are not significant to this invention and may be selected from a variety of those available.

A plurality of control units 120, 121, . . . , 12m are interconnected to the host processors 101–10n by the switching network 100. Each control unit 120–12m has one or more remote nodes T attached to it. The remote nodes T may be devices such as terminals, personal computers, cluster control units, communication controllers or host processors. The composition and characteristics of such remote nodes are not significant to this invention and will vary from one installation to another. The switching network 100 contains a control unit 131 and a matrix switch which are well known in the art, and the operation of the switching network 100 is determined by the type of switch selected.

Host processors 101-10n may be either a type T5 or T2.1 node as defined in SNA architecture and each includes one or more end user application programs (LUs) and a control program. Each node, which may be anything from a small personal computer to a large main frame, also typically contains a system services control point (SSCP) or other type of control point (CP) and may also contain a physical unit (PU). Each host processor may perform a number of functions for terminals or other remote nodes that are connected to the network 100 directly or through control units 120-12m.

The host processors 101-10n are also connected to a common control function 130 which is used to monitor the activity of the host processors and to notify the other host processors when one of them fails. This "heartbeat" control function 130 may physically reside in one or more of the host processors 101-10n or in a separate device. Examples of how the control function might be implemented are:

1. channel-to-channel (CTC) from each host processor to all other host processors capable of performing the heartbeat control function 130
2. shared DASD accessible directly from each host processor and monitored by the heartbeat control function 130 assigned to one of them
3. sessions from each host processor to all other host processors through either the network 100 or via a separate path 130
4. memory shared by all of the host processors and used similarly to the DASD where a heartbeat control function monitors the activity of each host processor
5. a separate box that is connected to all of the host processors and which sends a signal to each processor which in turn sends a signal back to the control function indicating that it has not failed.

The examples 1-5 above are intended to illustrate a number of well known techniques of how this function might be implemented and are not intended to be a complete list.

Each control unit 120-12m may typically be a communication controller such as the IBM 3745, a control unit such as an IBM 3174 or other similar devices. The control units may be type T5, T4, T2.0 or T2.1 nodes as defined in SNA. Each such control unit may have one or more remote nodes T attached to them, or may themselves be remote nodes with terminals attached to them.

An example of switching system 100 is the IBM 3814 Switching Management System which uses the Multi-System Configuration Manager (MSCM), a licensed program that resides in a host processor.

Figure 2B:
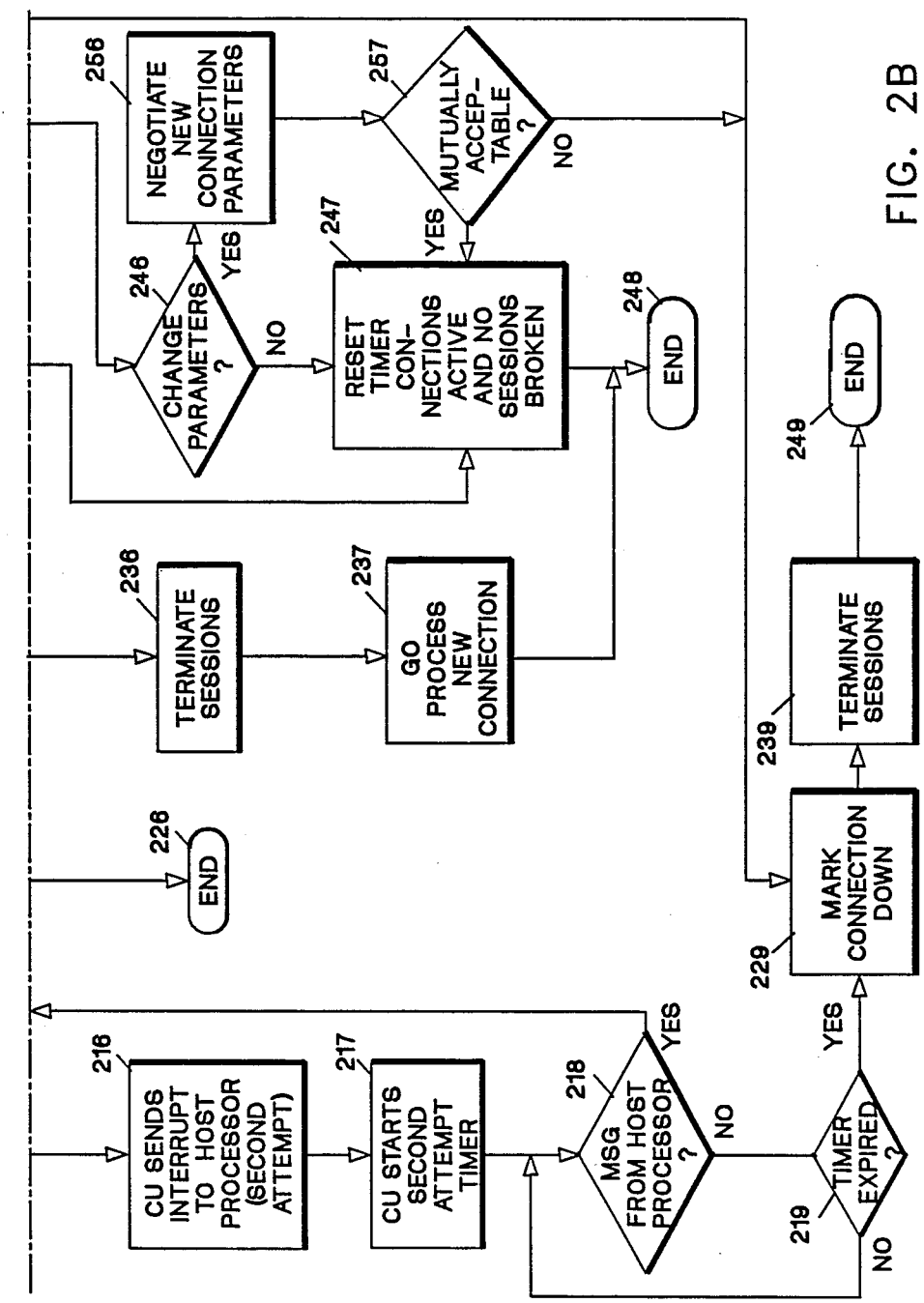

All of the equipment illustrated in FIG. 1 is currently available and requires, in addition to existing programs, additional programming illustrated in the flow charts shown in FIGS. 2 and 3. These flow charts, along with the description, include that information which would allow a skilled programmer to write programs suitable for use in equipment constructed according to different architectures.

FIG. 2 shows the logic flow where a control unit 120-12m (FIG. 1) attempts to communicate with a host processor 101-10n (FIG. 1) for one of several reasons and assumes sessions between all parts have been established according to IBM SNA procedures. The following four examples are not intended to be inclusive and are illustrative only.

1. it has completed a unit of work requested by the host processor
2. it has received a request from a remote node and requires the services of the host processor
3. it is itself a host processor and wishes to contact another host processor
4. it has internally detected a period of a predetermined length, known as an "idle timeout," when no activity has occurred between it and the host processor.

Block 211 in FIG. 2 shows the logical beginning of the function where a control unit (CU 120-12m in FIG. 1) sends an interrupt or attention to a host processor and waits for a message from the processor. The CU sends an interrupt to a host processor in block 212 and starts a "first attempt" timer in block 213. The CU then begins a loop composed of blocks 214 and 215. The CU checks to see if there is a message from the host processor in block 214. If there is a message, the CU checks to see if it is an "eXchange IDentification" (or XID) in block 224. An XID passes parameters between two nodes when they are attempting to establish a connection. XID3 is used with the DLCs involving SNA Type 2.1 nodes. To minimize system definition, the XIDs convey DLC-specific parameters for the connection, as well as information about higher SNA layers. These parameters include such things as the unique station (node) identifier and data such as buffer size, maximum number of buffers, timeouts and delays. As part of this invention, the Nonactivation XID has been enhanced so that nodes can optionally negotiate changing the parameters after the connection has been established without breaking the connection. The enhanced Nonactivation XID is unique and not currently found in SNA. Prior to this invention, these parameters were agreed to when the connection was first established and could not be changed without breaking and then re-establishing the connection.

In block 224, if the message is not an XID, then the CU processes the message as normal data from the host processor and resets the first or second attempt timer in block 225. The function then exits at block 226 and awaits more work. This is the normal path taken by the control unit in processing a message.

In block 214, if there is no message from the host processor, the control unit checks to see if the first attempt timer has expired in block 215. If the timer has not expired, the function loops back to block 214 and checks again for a message.

If the timer expires in block 215, the control unit sends another interrupt to the host processor in block 216 in case the host processor or the switching network lost the first interrupt which was set in 212. The actual number used may vary; however, the two illustrated in FIG. 2 would suffice in most circumstances. If more than two are required, the illustrated sequence can be expanded. The CU then starts the "second attempt" timer in block 217 and begins looping between blocks 218 and 219.

In block 218, the CU checks for a message from the host processor. If it finds one, the CU goes to block 224 and checks for an XID as discussed above. In block 218, if there is no message, the CU checks to see if the second attempt timer has expired in block 219. If the timer has not expired, it loops back to block 218 to check again for a message from the host processor.

If the second attempt timer expires in block 219, the connection (141, 142, ..., or 14n) to that host processor (101, 102, ..., or 10n) is marked as "no longer valid" in block 229. All sessions from that host processor are terminated in block 239 and the CU function completes in block 249. The host processor must be reactivated before it can run applications and again establish sessions with remote nodes.

Note that a limit of only two interrupt attempts from the CU is not considered an upper bounds in all cases. More attempts may be needed in some environments. This invention allows CUs to attempt a level of error recovery that didn't exist before, and the number of additional attempts can be chosen to fit the particular environment the system is operating in.

In block 224, if the message is an XID from the host processor, then it is checked to determine if it is a "Non-Activation XID" in block 234. If it is not, then the XID message is processed as an attempt by a host processor to establish a new connection. The existing connection is marked as "failed" in block 235 and all sessions using it are terminated in block 236. The XID message is then processed as an attempt at establishing a new connection in block 237 and the function ends in block 248.

If the message processed in block 234 is a Non-activation XID, then it is checked to see if it is an "enhanced non-activation XID" in block 244. If not, block 245 compares the host identifier and parameter set contained in this XID with the host identifier and parameter set agreed to when the connection was originally established. If they are identical, the CU resets the timer, leaves the connection active in block 247 and no sessions are broken. Processing completes in block 248.

If the host identifier or the parameters in the XID are different in block 245, then the connection is marked down in block 229, all the sessions from that host processor are terminated in block 239 and the CU function completes in block 249. As discussed above, the host processor must be reactivated before it can run applications and again establish sessions with remote nodes.

If the XID is the enhanced non-activation XID in block 244, the control unit accepts the identity of the new session owner in block 254. The owner could be the same host processor or a new host processor. The control unit does not terminate any sessions at this time.

In block 246, the control unit checks to see if the parameters associated with the enhanced Non-activation XID are identical to the ones agreed to when the connection was initially established. If the parameters are identical, the CU marks the connection as "active" in block 247 and completes processing in 248.

If the parameters are different in block 246, then the control unit may accept them or negotiate additional changes in block 256. If the control unit and the host processor can agree on a new set of parameters in block 257, the connection is marked as active in block 247 and processing is completed in block 248. If a new set of parameters can not be agreed to in block 257, the connection is marked as failed in block 229, all sessions using it are broken in block 239 and the process ends in block 249.

FIG. 3 shows the detection of a failed host processor (101-10n in FIG. 1) by the control function 130, and the subsequent movement of the sessions to applications on it over to a recovery processor.

Block 311 shows the logical beginning of the function. In block 312 connections are established between the host processors and the switching network. In block 312, connections are also established between each host processor and the control function (130 in FIG. 1). In block 313, a "heartbeat" timer duration is determined and used to determine the subsequent validity of all of the host processors connected to it. At the interval determined above, the control 130 (in FIG. 1) checks to see if all of its host processors are still active. If all are active as determined in block 314, the control function 130 waits for the next time interval to expire and it again checks the status of all of the host processors it is responsible for.

If the control 130 determines that a host processor has detected a link failure or that a host processor has failed in block 314, the control 130 initiates session takeover in block 324. Control 130 may notify the switching network control unit 131 to alter the connections to the control units (120-12m in FIG. 1) to one or more other host processors and notify those host processors to initiate recovery, or the control 130 may notify each recovering host processor to begin its recovery sequence to the affected control units (121-12m) directly if the switching network 100 is of a type capable of dynamically switching.

In block 325, each recovering host processor sends an enhanced Non-activation XID to each control unit (121-12m) that had sessions with an application it is now running, as directed by control 130.

Upon receipt of the enhanced Non-activation XID generated in block 326, each affected control unit (121-12m) will initiate the process described in FIG. 2. Upon completion of the process in block 326, all affected sessions will be moved to one or more recovery processors without being broken, or the sessions will be terminated because they can not be successfully moved to another host processor (FIG. 2, block 257). This invention allows the processing by the CU to be designed so that sessions and data integrity are maintained in an environment which includes a plurality of host processors having widely differing configurations and capabilities and at the same time substantially increase communication throughput, since the reduction in the number of sessions which must be reestablished is significantly reduced.

The process completes when the function branches to block 327.

We claim:

1. In a computer communication system including a plurality of host systems connected to each other by a host communication system for exchanging information about the status of the connections maintained at the respective host systems and each selectively to a plurality of communication control units by a switching network controlled by switching signals supplied by the individual host systems, a method for the non-destructive relocation of communication sessions established between respective host systems and remote devices connected to the respective communication controllers comprising the following steps:

at each said control unit for each active connection between a host system and a remote device over which one or more communication sessions are being conducted, establishing a first and a second time period, setting said first time period on when service over the connection is required, monitoring the connection for a valid state and resetting said first time period if the connection assumes a valid state prior to the expiration of the first time period, upon the expiration of at least one cycle of the said first time period, starting said second time period and thereafter deactivating the suspended sessions associated with the connection upon the expiration of the second time period;

at each of said host systems monitoring the status of preselected connections at preselected host systems and upon detection of at least one predetermined status, establishing an alternate connection via said switching network to the associated communication control unit, and generating and sending a unique command via the alternate connection to the connected communication control unit indicating the establishment of the alternate connection; and at a communication control unit receiving the said unique command, reassigning the session assigned to the prior connection via the established alternate connection and resetting the said first and second time period provided the unique command is received prior to the expiration of the said second time period.

2. A method as set forth in claim 1 in which said control unit allows more than one cycle of the first time period to expire before starting the second time period.

* * * * *